(12) United States Patent
Zhai et al.

(10) Patent No.: US 11,402,494 B2
(45) Date of Patent: Aug. 2, 2022

(54) METHOD AND APPARATUS FOR END-TO-END SAR IMAGE RECOGNITION, AND STORAGE MEDIUM

(71) Applicant: WUYI University, Guangdong (CN)

(72) Inventors: Yikui Zhai, Guangdong (CN); Wenbo Deng, Guangdong (CN); Qirui Ke, Guangdong (CN); He Cao, Guangdong (CN); Junying Gan, Guangdong (CN); Ying Xu, Guangdong (CN)

(73) Assignee: WUYI University, Guangdong (CN)

( * ) Notice: Subject to any disclaimer, the term of this patent is extended or adjusted under 35 U.S.C. 154(b) by 528 days.

(21) Appl. No.: 16/532,361

(22) Filed: Aug. 5, 2019

(65) Prior Publication Data

US 2021/0003697 A1    Jan. 7, 2021

(30) Foreign Application Priority Data

Jul. 2, 2019   (CN) .......................... 201910589536.4

(51) Int. Cl.
*G01S 13/90*   (2006.01)
*G06N 3/08*    (2006.01)
*G06N 3/04*    (2006.01)
*G06K 9/62*    (2022.01)

(52) U.S. Cl.
CPC ...... *G01S 13/9021* (2019.05); *G01S 13/9004* (2019.05); *G06K 9/6256* (2013.01); *G06N 3/0454* (2013.01); *G06N 3/08* (2013.01)

(58) Field of Classification Search
CPC .......... G06N 3/02–105; G01S 13/9021–9029; G01S 13/9004; G06K 9/6256; G06V 10/25
See application file for complete search history.

(56) References Cited

U.S. PATENT DOCUMENTS

| | | | |
|---|---|---|---|
| 9,978,013 B2 * | 5/2018 | Kaufhold | G06N 3/0463 |
| 10,643,123 B2 * | 5/2020 | Kaufhold | G06N 3/0454 |
| 10,976,429 B1 * | 4/2021 | Jiang | G06N 3/063 |
| 11,150,327 B1 * | 10/2021 | Jiang | G01S 13/9027 |
| 2021/0319243 A1 * | 10/2021 | Jin | G06K 9/6256 |

* cited by examiner

*Primary Examiner* — Matthew M Barker
(74) *Attorney, Agent, or Firm* — Farjami & Farjami LLP (57) ABSTRACT

Disclosed are a method and an apparatus for end-to-end SAR image recognition, and a storage medium. According to the disclosure, a generative adversarial network is used to enhance data and improve data richness of a SAR image, which is beneficial to subsequent network training; a semantic feature enhancement technology is also introduced to enhance semantic information of a SAR deep feature by a coding-decoding structure, which improves performances of SAR target recognition; and meanwhile, an end-to-end SAR image target recognition model with high integrity for big scenes like the Bay Area is constructed, which is helpful to improve a synthetic aperture radar target recognition model for big scenes like the Bay Area from local optimum to global optimum, increases the stability and generalization ability of the model, reduces the network complexity, and improves the target recognition accuracy.

9 Claims, 5 Drawing Sheets

METHOD AND APPARATUS FOR END-TO-END SAR IMAGE RECOGNITION, AND STORAGE MEDIUM

CROSS REFERENCE TO RELATED APPLICATION

This application claims the benefit of CN patent application no. 201910589536.4, filed Jul. 2, 2019, the entire disclosures of which are hereby incorporated herein by reference.

FIELD

The disclosure relates to the field of image recognition technologies, in particular to a method and apparatus for end-to-end SAR image recognition, and a storage medium.

BACKGROUND

Synthetic Aperture Radar (SAR) is a microwave imaging device with extremely high resolution, which employs a pulse compression technology and a synthetic aperture principle to image a ground scene, and plays an important role in the fields of environmental monitoring, resource exploration, mapping and battlefield investigation, etc. With the advancement of construction of Guangdong-Hong Kong-Macao Greater Bay Area, the demand for application of SAR images for safety monitoring of the Bay Area has been continuously enhanced, especially in the areas of remote sensing aviation aircraft monitoring, dynamic monitoring of ship targets, and dynamic monitoring of oil spill early-warning, or the like.

The conventional machine learning method is applied to SAR target recognition in a large scene, including task steps such as data processing, feature extraction, classification and recognition, and will make the results of each step depend on each other, but make the operations be separated from each other, which is not conducive to the overall optimization of model performances. Therefore, the construction problem of a high-performance SAR target recognition model in large scenes for the Bay Area needs to be solved urgently.

SUMMARY

The object of the disclosure is to solve at least one of the technical problems existing in the prior art, and provide a method for end-to-end SAR image recognition, an SAR image recognition apparatus and a storage medium to reduce network complexity and improve target recognition accuracy.

A technical solution employed by the disclosure to solve the technical problems thereof is as follows.

A first aspect of the disclosure provides a method for end-to-end SAR image recognition, including:

constructing a SAR image database with reference to an original SAR image and a SAR image virtual sample generated by a generative adversarial network;

obtaining a SAR feature image with an apparent feature by processing the SAR image to be detected sequentially using a deep vision feature extraction network trained by the SAR image database and a semantic feature enhancement network;

performing region framing and screening on the SAR feature image by a region proposal box network to obtain a SAR region feature image with a proposal box region feature;

processing the apparent feature by methods of region-of-interest feature coding and region-of-interest pooling to obtain a region detection feature, and performing target detection on the SAR image to be detected according to the region detection feature by a detection network to obtain a SAR target detection image and a compensation value returned to a detection box; and processing the proposal box region feature by the methods of region-of-interest feature coding and region-of-interest pooling to obtain a region recognition feature, and discriminating a loss of the SAR image to be detected according to the region recognition feature by a recognition network to recognize a label and obtain a SAR target recognition image with an indicated label attribute.

In some embodiments, constructing the SAR image database with reference to the original SAR image and the SAR image virtual sample generated by the generative adversarial network includes the following steps of:

performing electromagnetic simulation processing on the original SAR image to obtain a SAR electromagnetic simulation image;

constructing the generative adversarial network and processing the original SAR image and the SAR electromagnetic simulation image by the generative adversarial network to obtain the SAR image virtual sample; and preprocessing the original SAR image and the SAR image virtual sample to obtain the SAR image database.

In some embodiments, the deep vision feature extraction network trained by the SAR image database includes an original foundation deep neural network and a foundation deep neural network trained by the SAR image database; and obtaining a SAR feature image with an apparent feature by processing the SAR image to be detected sequentially using a deep vision feature extraction network trained by the SAR image database and a semantic feature enhancement network includes the following steps of:

training the original foundation deep neural network by using the SAR image to be detected, and transferring data of the foundation deep neural network trained by the SAR image database to the foundation deep neural network trained by the SAR image to be detected to obtain an initialized deep vision feature extraction network;

performing network optimization on the initialized deep vision feature extraction network by using an activation function, so that the initialized deep vision feature extraction network outputs a feature output pattern; and simulating, coding and decoding the feature output pattern by the semantic feature enhancement network to obtain the SAR feature image with an apparent feature.

In some embodiments, performing region framing and screening on the SAR feature image by the region proposal box network to obtain the SAR region feature image with a proposal box region feature includes the following steps of:

transmitting the SAR feature image to the region proposal box network to generate a detection box region;

comparing an Intersection over Union of the detection box region and a true value region with a threshold, and outputting a positive sample image in which the Intersection over Union of the detection box region and the true value region is greater than the threshold; and screening k SAR region feature images with a proposal box region feature and a maximum confidence value by using a non-maximum suppression method.

A second aspect of the disclosure provides an apparatus for end-to-end SAR image recognition, including:

a data enhancement module configured to construct a SAR image database with reference to an original SAR image and a SAR image virtual sample generated by a generative adversarial network;

a feature enhancement module configured to obtain a SAR feature image with an apparent feature by processing the SAR image to be detected sequentially using a deep vision feature extraction network trained by the SAR image database and a semantic feature enhancement network;

a proposal box generating module configured to input the SAR feature image into a region proposal box network to perform region framing and screening to obtain a SAR region feature image with a proposal box region feature;

a target detection module configured to process the apparent feature by methods of region-of-interest feature coding and region-of-interest pooling to obtain a region detection feature, and perform target detection on the SAR image to be detected according to the region detection feature by a detection network to obtain a SAR target detection image and a compensation value returned to a detection box; and a target recognition module configured to process the proposal box region feature by the methods of region-of-interest feature coding and region-of-interest pooling to obtain a region recognition feature, and discriminate a loss of the SAR image to be detected according to the region recognition feature by a recognition network to recognize a label and obtain a SAR target recognition image with an indicated label attribute.

In some embodiments, the data enhancement module includes:

a simulation module configured to perform electromagnetic simulation processing on the original SAR image to obtain a SAR electromagnetic simulation image;

a virtual sample generating module configured to construct the generative adversarial network and process the original SAR image and the SAR electromagnetic simulation image by the generative adversarial network to obtain the SAR image virtual sample; and a preprocessing module configured to preprocess the original SAR image and the SAR image virtual sample to obtain the SAR image database.

In some embodiments, the deep vision feature extraction network trained by the SAR image database includes an original foundation deep neural network and a foundation deep neural network trained by the SAR image database, and the feature enhancement module includes:

a transfer learning module configured to train the original foundation deep neural network by using the SAR image to be detected, and transfer data of the foundation deep neural network trained by the SAR image database to the foundation deep neural network trained by the SAR image to be detected to obtain an initialized deep vision feature extraction network;

a network optimization module configured to perform network optimization on the initialized deep vision feature extraction network by using an activation function, so that the initialized deep vision feature extraction network outputs a feature output pattern; and a semantic feature enhancement module configured to simulate, code and decode the feature output pattern by the semantic feature enhancement network to obtain the SAR feature image with an apparent feature.

In some embodiments, the proposal box generating module includes:

a detection box generating module configured to transmit the SAR feature image to the region proposal box network to generate a detection box region;

a comparison module configured to compare an Intersection over Union of the detection box region and a true value region with a threshold, and output a positive sample image in which the Intersection over Union of the detection box region and the true value region is greater than the threshold; and a screening module configured to screen k SAR region feature images with a proposal box region feature and a maximum confidence value by using a non-maximum suppression method.

A third aspect of the disclosure provides an apparatus for end-to-end SAR image recognition including a processor, and a memory connecting to the processor and having instructions stored thereon, wherein the instructions, when executed by the processor, enable the processor to execute the method for end-to-end SAR image recognition according to the first aspect of the disclosure.

A fourth aspect of the disclosure provides a storage medium having computer-executable instructions stored thereon, wherein the computer-executable instructions, when executed by a computer, cause the computer to execute the method for end-to-end SAR image recognition according to the first aspect of the disclosure.

The technical solution provided by the disclosure has the following beneficial effects. The generative adversarial network is used to enhance data and improve data richness of the SAR image, which is beneficial to subsequent network training. A semantic feature enhancement technology is also introduced to enhance semantic information of the SAR deep feature by a coding-decoding structure, which improves performances of the SAR target recognition. Meanwhile, an end-to-end SAR image target recognition model with high integrity for big scenes like the Bay Area is constructed, which is helpful to improve a synthetic aperture radar target recognition model for big scenes like the Bay Area from local optimum to global optimum, increases the stability and generalization ability of the model, reduces the network complexity, and improves the target recognition accuracy.

BRIEF DESCRIPTION OF THE DRAWINGS

The disclosure is further explained with reference to the drawings and embodiments hereinafter.

DETAILED DESCRIPTION OF THE EMBODIMENTS

The detailed description of the disclosure will be described herein, the preferred embodiments of the disclosure are shown in the drawings, the drawings are intended to supplement the description in the written portion of the specification with figures, so that one can intuitively and vividly understand each technical feature and the overall technical solution of the disclosure, but it shall not be understood as a limitation to the protection scope of the disclosure.

The accuracy of end-to-end SAR target recognition for big scenes like Guangdong-Hong Kong-Macao Greater Bay Area depends on both the richness of target data and the perfection and interpretability of extracted features. The conventional target recognition method has complicated steps which greatly increase the network complexity, is highly subject to manual intervention, is not easy to converge an overall model, and global optimization of model training is difficult to achieve.

Figure 1:
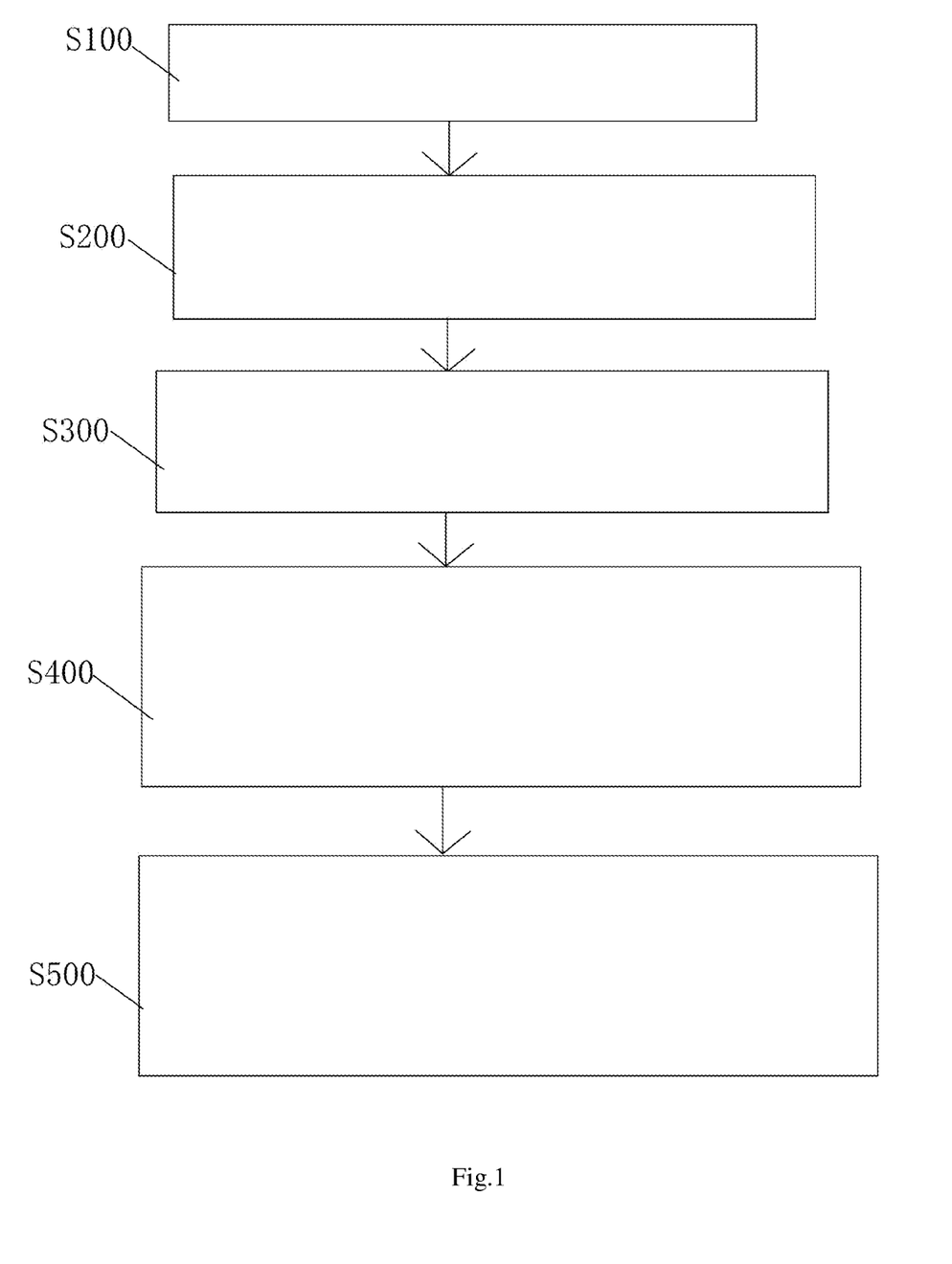
FIG. 1 is a flow chart of a method for end-to-end SAR image recognition according to an embodiment of the disclosure.

Based on this and referring to FIG. 1, an embodiment of the disclosure provides a method for end-to-end SAR image recognition, including:

step S100: constructing a SAR image database with reference to an original SAR image and a SAR image virtual sample generated by a generative adversarial network;

step S200: obtaining a SAR feature image with an apparent feature by processing the SAR image to be detected sequentially using a deep vision feature extraction network trained by the SAR image database and a semantic feature enhancement network;

step S300: performing region framing and screening on the SAR feature image by a region proposal box network to obtain a SAR region feature image with a proposal box region feature;

step S400: processing the apparent feature by methods of region-of-interest feature coding and region-of-interest pooling to obtain a region detection feature, and performing target detection on the SAR image to be detected according to the region detection feature by a detection network to obtain a SAR target detection image and a compensation value returned to a detection box; and step S500: processing the proposal box region feature by the methods of region-of-interest feature coding and region-of-interest pooling to obtain a region recognition feature, and discriminating a loss of the SAR image to be detected according to the region recognition feature by a recognition network to recognize a label and obtain a SAR target recognition image with an indicated label attribute.

In the embodiment, the generative adversarial network is used to enhance data and improve data richness of the SAR image, which is beneficial to subsequent network training. A semantic feature enhancement technology is also introduced to enhance semantic information of the SAR deep feature by a coding-decoding structure, which improves the performance of the SAR target recognition. Meanwhile, an end-to-end SAR image target recognition model with high integrity for big scenes like the Bay Area is constructed, which is helpful to improve a synthetic aperture radar target recognition model for big scenes like the Bay Area from local optimum to global optimum, increases the stability and generalization ability of the model, reduces the network complexity, and improves the target recognition accuracy.

Figure 2:
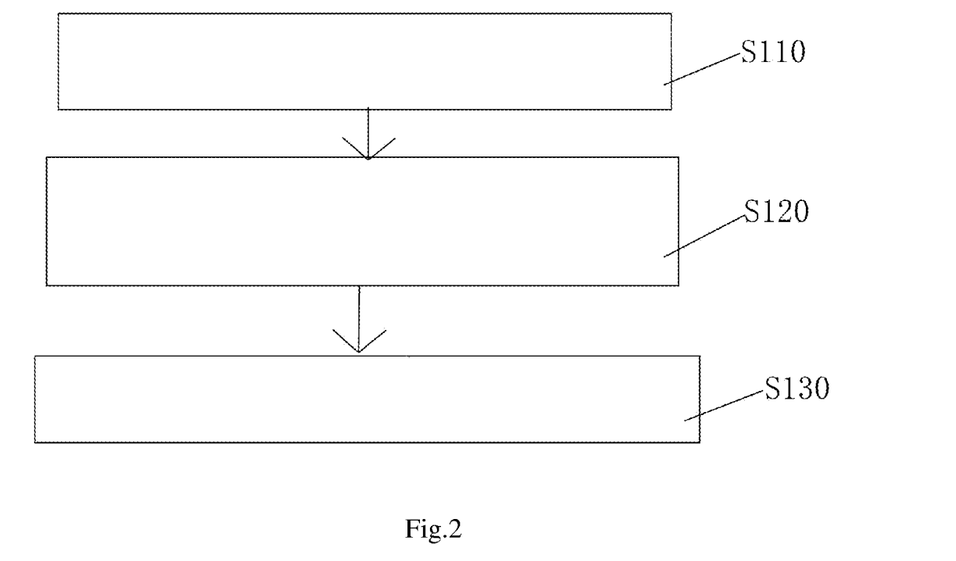
FIG. 2 is a specific flow chart of step S100 in FIG. 1.
Figure 6:
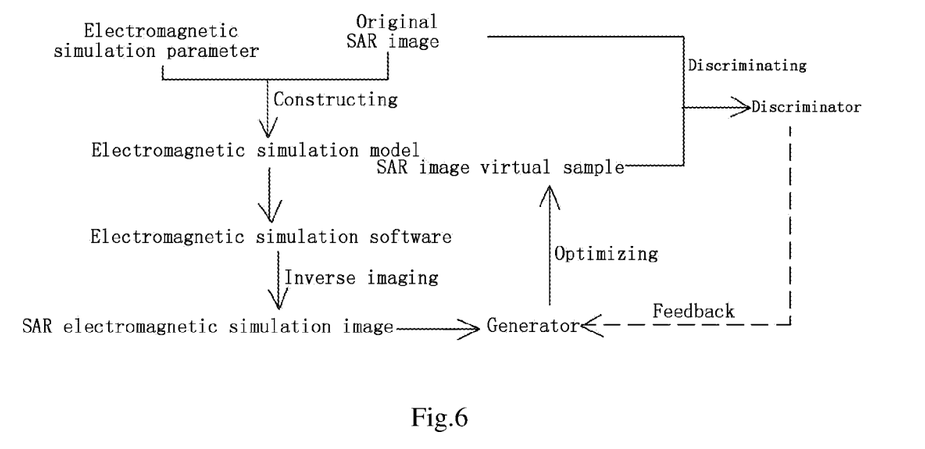
FIG. 6 is a schematic principle diagram of step S100 in FIG. 1.

Referring to FIG. 2 and FIG. 6, the step S100 further includes:

step S110: performing electromagnetic simulation processing on the original SAR image to obtain a SAR electromagnetic simulation image;

step S120: constructing the generative adversarial network and processing the original SAR image and the SAR electromagnetic simulation image by the generative adversarial network to obtain the SAR image virtual sample; and step S130: preprocessing the original SAR image and the SAR image virtual sample to obtain the SAR image database.

In this embodiment, an SAR target image is processed by electromagnetic simulation to acquire a multi-azimuth SAR electromagnetic simulation image, which overcomes the shortcoming of traditional acquisition of insufficient SAR target image samples, and provides sufficient data input for subsequently solving the problem of scare training data in the process of deep learning training. A mapping relationship between the SAR electromagnetic simulation image and the SAR target image is learned by a generative adversarial network, which improves data richness of the SAR electromagnetic simulation image, thus expanding the angle-missing SAR target image and providing strong support for the subsequent recognition and detection of the SAR target image.

In some embodiments, the step S110 includes the following steps of:

step S111: constructing an electromagnetic simulation model by using the original SAR image and electromagnetic simulation parameters;

step S112: processing the electromagnetic simulation model by electromagnetic simulation software to obtain RCS data of the original SAR image; and step S113: performing inverse imaging processing on the RCS data to obtain a SAR electromagnetic simulation image.

Specifically, in the step S111, the electromagnetic simulation parameters include resolution, incidence angle, carrier frequency band. The electromagnetic model is established to mainly include point targets and ground targets. The point targets are mainly used to verify the inverse imaging performance of RCS data and a relative positional relationship of the targets. The ground targets mainly provides data input for subsequent deep learning.

In the step S112, simulation parameters of the constructed electromagnetic simulation model are set in CST simulation software, and RCS data, i.e., a scattering coefficient radar cross-sectional area, of the SAR target image corresponding to incident-angle azimuth is obtained with an simulation algorithm.

In some embodiments, the step S120 includes:

step S121: constructing a generator and a discriminator in the generative adversarial network;

step S122: inputting the SAR electromagnetic simulation image to the generator to obtain a SAR image virtual sample with the same data distribution as the SAR electromagnetic simulation image;

step S123: inputting the original SAR image or virtual sample to the discriminator to obtain feedback information; and step S124: optimizing, by the generator, the SAR image virtual sample according to the feedback information.

It can be understood that a generative adversarial network (GAN) is a deep learning model. By the generator and the discriminator included in the GAN, the two produce good outputs by game learning. In the process of generating the SAR image virtual sample, the performance of the GAN can be stabilized through network optimization and hyper-parameter adjustment. In the application of the GAN, it is not required that both the generator and the discriminator are neural networks, as long as the generator and the discriminator can fit corresponding generation and discrimination functions. The GAN greatly enhances the data richness of the original SAR image.

Specifically, the generator captures the distribution of the SAR electromagnetic simulation image, and generates a virtual sample with the same data distribution as the SAR electromagnetic simulation image by using a noise obeying the data distribution; and the discriminator is a binary classifier, and discriminates the probability that the sample is from training data.

In some embodiments, in the step S130, the original SAR image and the SAR image virtual sample are preprocessed including denoising and normalization processing to reduce the computational complexity of the model, save training time and accelerate the convergence of the model. In addition, a centroid localization method can be used to measure the SAR image database to ensure the rationality and universality of the SAR image database.

Figure 3:
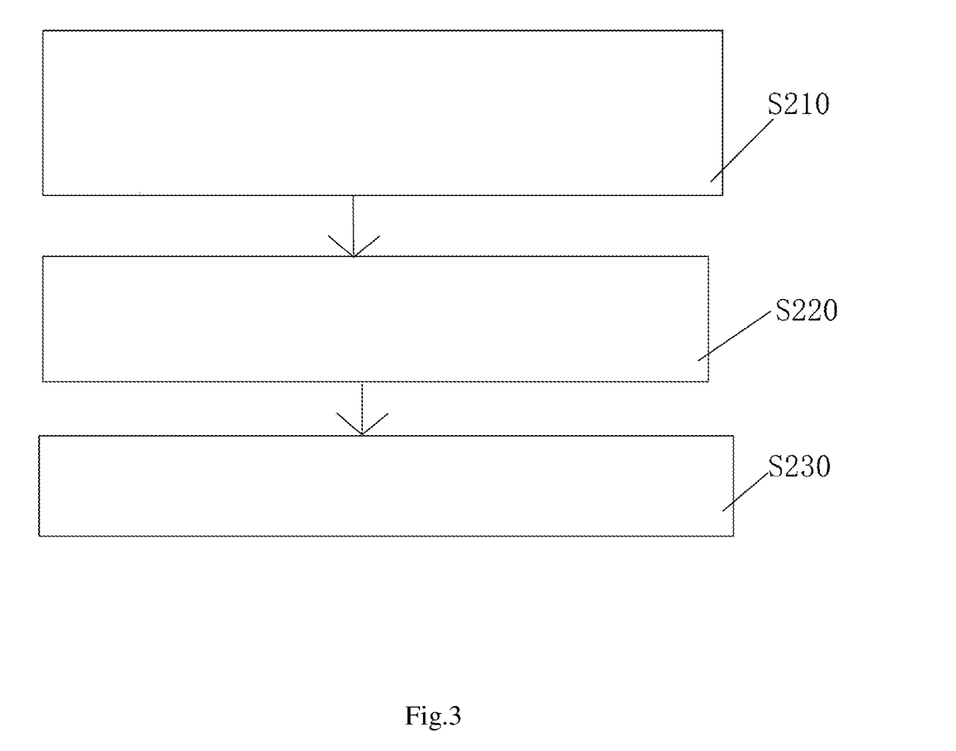
FIG. 3 is a specific flow chart of step S200 in FIG. 1.

Referring to FIG. 3, in some embodiments, in the step S200, the deep vision feature extraction network trained by the SAR image database includes an original foundation deep neural network and a foundation deep neural network trained by the SAR image database. And the step S200 includes:

step S210: training the original foundation deep neural network by using the SAR image to be detected, and transferring data of the foundation deep neural network trained by the SAR image database to the foundation deep neural network trained by the SAR image to be detected to obtain an initialized deep vision feature extraction network;

step S220: performing network optimization on the initialized deep vision feature extraction network by using an activation function, so that the initialized deep vision feature extraction network outputs a feature output pattern; and step S230: simulating, coding and decoding the feature output pattern by the semantic feature enhancement network to obtain the SAR feature image with an apparent feature.

Specifically, in the step S210, the original foundation deep neural network is firstly trained by using the SAR image to be detected; then, the data of the foundation deep neural network trained by the SAR image database is transferred to the foundation deep neural network trained by the SAR image to be detected to obtain the initialized deep vision feature extraction network. It should be noted that the foundation deep neural network trained by the SAR image database has feature values corresponding to each layer after the network training is completed by the SAR image database. These feature values are transferred and learned to the foundation deep neural network trained by the SAR image to be detected, so that the foundation deep neural network trained by the SAR image to be detected obtains a fixed initialization value for each layer instead of a randomly set initial value. Through transfer learning, the problem of insufficient samples of the SAR target image is solved, so that the convergence speed of a deep neural network is effectively improved.

In the step S220, a Maxout activation function layer is connected after a final fully connected layer of the initialized deep vision feature extraction network, and a local maximum weight of a feature parameter is output. Meanwhile, a ReLU activation function layer is connected after the Maxout activation function layer, and a local optimal weight of the feature parameter is output. Finally, a new fully connected layer is connected after the ReLU activation function layer, and the feature parameter and the local optimal weight are classified to obtain the optimized feature output pattern.

Specifically, in the Maxout activation function layer, the local maximum weight of the feature parameter is output through an expression $$h_i(x) = \max_{j \in [1,k]} (x^T W_{ij} + b_{ij}), W \in R^{d*m*k}, b \in R^{m*k},$$

wherein $h_i$ is a local maximum weight of the $i^{th}$ parameter; $x^T$ is a weight set of input parameters, $W_{ij}$ is a three-dimensional weight matrix of $d*m*k$, b is a two-dimensional offset vector of $m*k$, d represents a number of input weights, m represents a number of hidden layer nodes, and k represents a number of nodes corresponding to linear output subsequently for each hidden layer node. The ReLU activation function layer has one-sided suppression; a negative value in the local maximum weight output by the Maxout activation function layer is changed to 0, while a positive value is unchanged to enhance the generalization ability of the parameter to optimize the parameter. The new fully connected layer re-classifies the feature parameter and the local optimal weight, and outputs the feature output pattern.

In the step S230, the feature output pattern is simulated, coded and decoded by the semantic feature enhancement network, and the feature output pattern is simulated by using a Gaussian white noise to obtain a simulated feature output value, wherein the Gaussian white noise is noise with probability density obeying normal distribution. Then, a coder is used to map the simulated feature output value from a feature space to a semantic space, so that the output value of each layer has different coding information to obtain a semantically enhanced semantic feature output value. Then a decoder is used to map the semantic feature output value from the semantic space to the feature space by means of deformation, size transformation and splicing to obtain the apparent feature with greatly enhanced expression capability of the semantic feature space. It should be noted that the coder and the decoder have the same architecture.

Figure 4:
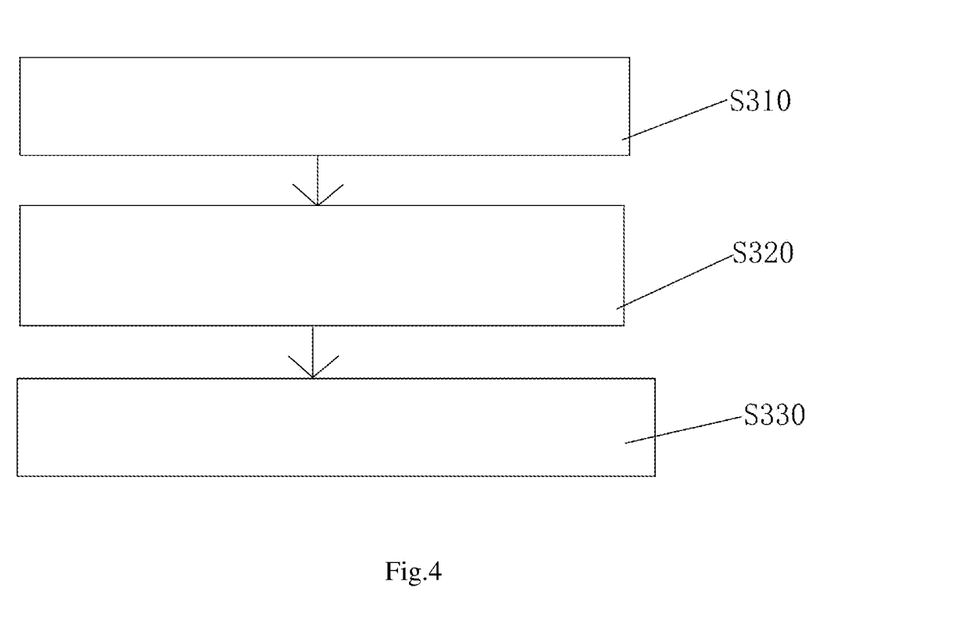
FIG. 4 is a specific flow chart of step S300 in FIG. 1.

Referring to FIG. 4, the step 300 further includes:

step 310: transmitting the SAR feature image to the region proposal box network to generate a detection box region;

step 320: comparing an Intersection over Union of the detection box region and a true value region with a threshold, and outputting a positive sample image in which the Intersection over Union of the detection box region and the true value region is greater than the threshold; and step 330: screening k SAR region feature images with a proposal box region feature and a maximum confidence value by using a non-maximum suppression method.

In the step 310, the region proposal box network is referred to as RPN network. The RPN network uses the SAR feature image as input to generate the detection box region on the SAR feature image. The RPN network uses two 256-D rectangular convolution filters to slide to generate two local features, then connects the two local features along a channel axis to generate a 512-D feature vector, and generates the detection box region according to the 512-D feature vector.

In the step 320, the Intersection over Union of the detection box region and the true value region is calculated firstly, i.e., the IoU (Intersection over Union) of the detection box region. Then the Intersection over Union of the detection box region and the true value region is compared with the threshold which specifically may be 0.7. The SAR feature images with a proposal box region generated by anchor points with IoU greater than 0.7 are positive sample images, while the SAR feature images with a proposal box region generated by anchor points with IoU less than 0.3 are negative sample images.

The anchor points are located in the center of each sliding window and associated with scales and length-width ratios. For instance, by default, three dimensions and three length-breadth ratios are used, so that each sliding position results in nine reference bounding boxes. In order to obtain the proposal box region, each anchor point is assigned with a binary category label, target or non-target. Then, a positive label is assigned to anchor points with an overlap of more than 0.7 IoU with a bounding box of the true value region. For all true bounding boxes, if the IoU of one anchor point with the bounding box of the true value region is less than 0.3, a negative label is assigned to the anchor point. According to the marking method above, a plurality of proposal box regions close to the true value region are generated on the SAR feature image, and coordinates and classification probability of the bounding boxes are predicted by using anchor boxes with multi-scales and length-width ratios, so that multi-scale prediction can be realized under the conditions of mapping only through single-scale images and features and using a single-size filter, and a large amount of time and energy are saved for subsequent calculation.

In addition, the proposal box region of the positive sample image is subjected to bounding box regression processing, and a specific loss function is:

$$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*) \quad (1)$$

where $L_{cls}$ is a classification loss function and an expression thereof is:

$$L_{cls}(p_i, p_i^*) = -\log[p_i^* p_i + (1-p_i^*)(1-p_i)];$$

$L_{reg}$ is a regression loss function and an expression thereof is:

$$L_{reg}(t_i, t_i^*) = R(t_i - t_i^*);$$

the function R is defined as:

$$\text{Smooth } L_1(x) = \begin{cases} 0.5x^2 & |x| < 1 \\ |x| - 0.5 & \text{others} \end{cases}$$

in formula (1), $p_i$ and $t_i$ are predicted values of bounding boxes and categories of the true value region; $p_i^*$ and $t_i^*$ are the true values of the bounding boxes and categories of the true value region; $\lambda$ is a balance weight; $N_{cls}$ and $N_{reg}$ are normalized parameters of a classification item and a regression item respectively.

In the step 330, the forward evaluation of the RPN network will result in IoU and bounding box offset with objectivity for the anchor points. A non-maximum suppression method is used to screen k SAR region feature images with a proposal box region feature and a maximum confidence value. Specifically, the value of k is 100.

In the step 400, two fully connected layers with 2048 neurons and a threshold of 0.5 are used to extract the region detection feature. Each apparent feature is flattened into a vector, and the region detection feature is obtained through two fully connected layers by methods of region-of-interest feature coding and region-of-interest pooling. Then, the coded region detection feature is simultaneously input into two separate linear transformation layers for respective label classification and bounding box regression to return the compensation value of the detection box. The detection network has two outputs, which respectively indicate a target probability that the SAR image to be detected is the SAR target detection image and a non-target probability that the SAR image to be detected is not the SAR target detection image. In addition, in the process of bounding box regression, four offset coefficients $(T_x, T_y, T_w, T_h)$ are output for a region-of-interest with a center of $(x_a, y_a)$, a width of $w_a$ and a length of $h_a$, wherein $T_x$ and $T_y$ are scale transformation factors; $T_w$ and $T_h$ are logarithmic values of the offset. The detection network returns the offset coefficient of each region-of-interest as the compensation value.

In the step S500, the proposal box region feature is processed by the methods of region-of-interest feature coding and region-of-interest pooling firstly to obtain the region recognition feature. A bidirectional recurrent neural network with CTC loss is used as the recognition network.

The bidirectional recurrent neural network can capture rich image information from multiple perspectives to make image recognition more accurate. Meanwhile, in order to overcome the defects of gradient disappearance or exploding in conventional RNN training, a Long Short Term Memory (LSTM) is adopted to selectively store the information for a long term. The bidirectional recurrent neural network can be used to effectively deal with the problems based on time series, and can memorize the previous information and apply the previous information to the calculation output at current, i.e. the nodes between the hidden layers are no longer connectionless but connected, and the input of the hidden layers includes not only the output of an input layer but also the output of the hidden layers at the previous moment. The neural structure adds a delay between the input and the target, thereby adding label information to the network, solving the problems that the images recovered by the conventional machine learning method are not clear enough and the features are not obvious, and improving the recognition accuracy.

Firstly, the bidirectional recurrent neural network includes two newly added convolution layers containing a ReLU activation function, each of which has 512 filters with a size of 3×2 respectively, and the first convolution layer can also use filters with a size of 3×1; meanwhile, a pooling window has a width of 1×2. The proposal box region feature can be changed to a sequence with a size of D×L, specifically D=512 and L=19.

In addition, two separate RNN layers are applied in the bidirectional recurrent neural network, wherein one RNN layer is in a forward direction and the other one is in a reverse direction. The two separate RNN layers are connected together, and the sequence is fed back to a linear transformation and transformed into probability distribution through a SoftMax layer. Then a CTC layer is used to decode the sequence probability, i.e., to find an approximate optimal path with the greatest probability through the sequence, so as to facilitate recognizing label information by distinguishing the loss later.

Finally, the loss of the SAR image to be detected is discriminated according to the region recognition feature by the bidirectional recurrent neural network to recognize the label and obtain the SAR target recognition image with an indicated label attribute. A loss function is used to compare a predicted value with a true value. The closer the predicted value is to the true value, the more accurate the discrimination result is, and the label corresponding to the predicted value is output correspondingly.

Figure 5:
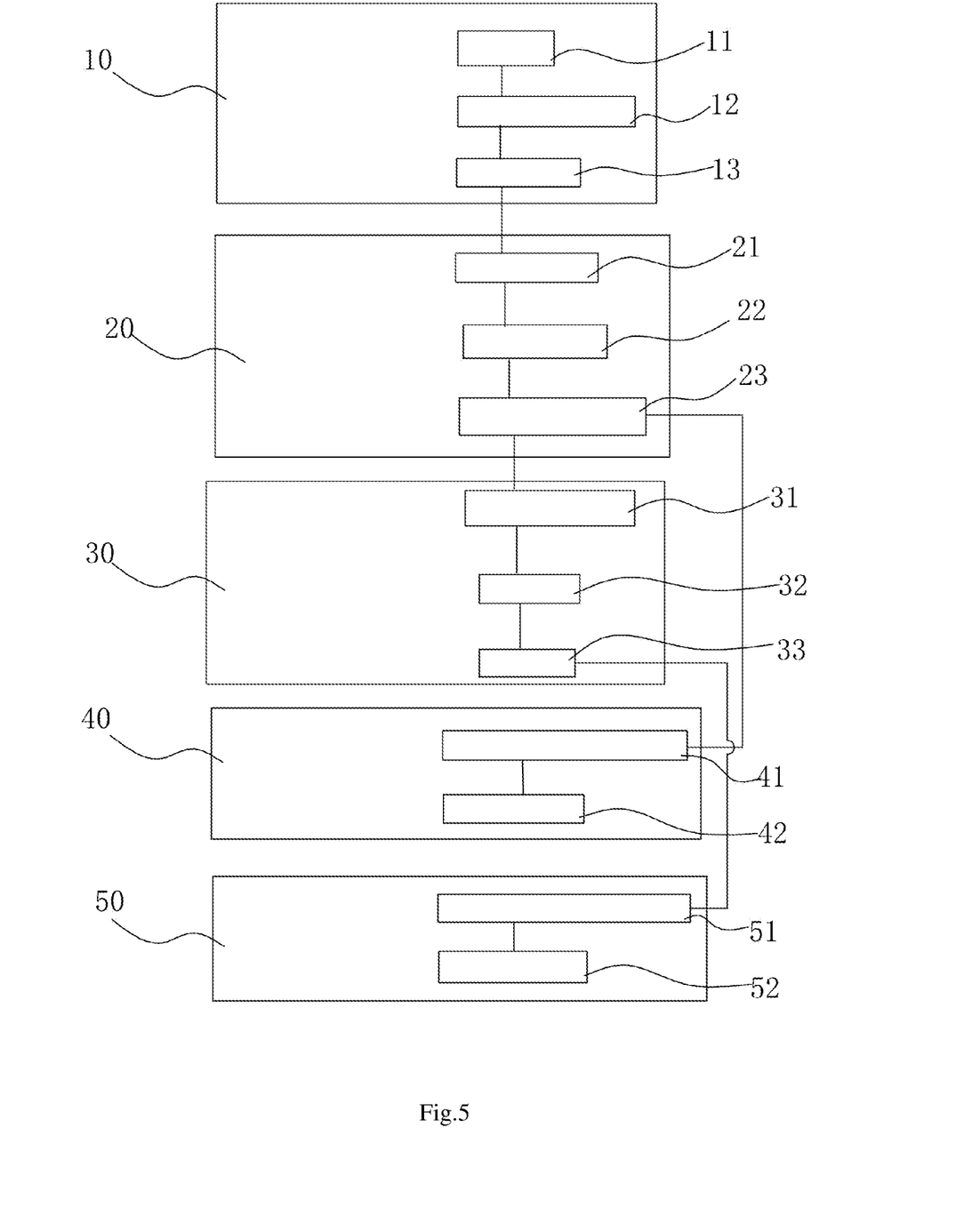
FIG. 5 is a structural diagram of an apparatus for end-to-end SAR image recognition according to an embodiment of the disclosure.

Referring to FIG. 5, an embodiment of the disclosure further provides an apparatus for end-to-end SAR image recognition based on the above method for end-to-end SAR image recognition, including:

a data enhancement module 10 configured to construct a SAR image database with reference to an original SAR image and a SAR image virtual sample generated by a generative adversarial network;

a feature enhancement module 20 configured to obtain a SAR feature image with an apparent feature by processing the SAR image to be detected sequentially using a deep vision feature extraction network trained by the SAR image database and a semantic feature enhancement network;

a proposal box generating module 30 configured to input the SAR feature image into a region proposal box network to perform region framing and screening to obtain a SAR region feature image with a proposal box region feature;

a target detection module 40 configured to process the apparent feature by methods of region-of-interest feature coding and region-of-interest pooling to obtain a region detection feature, and perform target detection on the SAR image to be detected according to the region detection feature by a detection network to obtain a SAR target detection image and a compensation value returned to a detection box; and a target recognition module 50 configured to process the proposal box region feature by the methods of region-of-interest feature coding and region-of-interest pooling to obtain a region recognition feature, and discriminate a loss of the SAR image to be detected according to the region recognition feature by a recognition network to recognize a label and obtain a SAR target recognition image with an indicated label attribute.

In some embodiments, the data enhancement module 10 includes:

a simulation module 11 configured to perform electromagnetic simulation processing on the original SAR image to obtain a SAR electromagnetic simulation image;

a virtual sample generating module 12 configured to construct the generative adversarial network and process the original SAR image and the SAR electromagnetic simulation image by the generative adversarial network to obtain the SAR image virtual sample; and a preprocessing module 13 configured to preprocess the original SAR image and the SAR image virtual sample to obtain the SAR image database.

In some embodiments, in the feature enhancement module 20, the deep vision feature extraction network trained by the SAR image database includes an original foundation deep neural network and a foundation deep neural network trained by the SAR image database; and the feature enhancement module 20 includes:

a transfer learning module 21 configured to train the original foundation deep neural network by using the SAR image to be detected, and transfer data of the foundation deep neural network trained by the SAR image database to the foundation deep neural network trained by the SAR image to be detected to obtain an initialized deep vision feature extraction network;

a network optimization module 22 configured to perform network optimization on the initialized deep vision feature extraction network by using an activation function, so that the initialized deep vision feature extraction network outputs a feature output pattern; and a semantic feature enhancement module 23 configured to simulate, code and decode the feature output pattern by the semantic feature enhancement network to obtain the SAR feature image with an apparent feature.

In some embodiments, the proposal box generating module 30 includes:

a detection box generating module 31 configured to transmit the SAR feature image to the region proposal box network to generate a detection box region;

a comparison module 32 configured to compare an Intersection over Union of the detection box region and a true value region with a threshold, and output a positive sample image in which the Intersection over Union of the detection box region and the true value region is greater than the threshold; and a screening module 33 configured to screen k SAR region feature images with a proposal box region feature and a maximum confidence value by using a non-maximum suppression method.

In some embodiments, the target detection module 40 includes:

a first region-of-interest processing module 41 configured to process the apparent feature by methods of region-of-interest feature coding and region-of-interest pooling to obtain a region detection feature; and a detection network module 42 configured to perform target detection on the SAR image to be detected according to the region detection feature to obtain a SAR target detection image and a compensation value returned to a detection box.

The target recognition module 50 includes:

a second region-of-interest processing module 51 configured to process the proposal box region feature by the methods of region-of-interest feature coding and region-of-interest pooling to obtain a region recognition feature; and a recognition network module 52 configured to discriminate a loss of the SAR image to be detected according to the region recognition feature to recognize a label and obtain a SAR target recognition image with an indicated label attribute.

It should be noted that since the processing procedures of the first region-of-interest processing module 41 and the second region-of-interest processing module 51 are consistent, in some embodiments, the first region-of-interest processing module 41 and the second region-of-interest processing module 51 may be integrated into a single region-of-interest processing module.

Another embodiment of the disclosure provides an apparatus for end-to-end SAR image recognition including a processor, and a memory connecting to the processor and having instructions stored thereon, the instructions is executable by the processor to enable the processor to execute the method for end-to-end SAR image recognition as described above.

Another embodiment of the disclosure provides a storage medium having computer-executable instructions stored thereon, wherein the computer-executable instructions, when executed by a computer, causes the computer to execute the method for end-to-end SAR image recognition as described above.

It should be noted that the apparatus for end-to-end SAR image recognition and the storage medium provided in the above embodiments are both based on the method for end-to-end SAR image recognition, and has the same beneficial effects as that of the method for end-to-end SAR image recognition, which are mainly represented as follows. The generative adversarial network is used to enhance data and improve data richness of the SAR image, which is beneficial to subsequent network training. A semantic feature enhancement technology is also introduced to enhance semantic information of the SAR deep feature by a coding-decoding structure, which improves performance of the SAR target recognition. Meanwhile, an end-to-end SAR image target recognition model with high integrity for big scenes like the Bay Area is constructed, which is helpful to improve a synthetic aperture radar target recognition model for big scenes like the Bay Area from local optimum to global optimum, increases the stability and generalization ability of the model, reduces the network complexity, and improves the target recognition accuracy.

The foregoing descriptions are merely preferred embodiments of the disclosure, and the disclosure is not limited to the foregoing embodiments. Any technical solution that achieves the object of the disclosure by basically the same means shall fall within the protection scope of the disclosure.

What is claimed is:

1. A method for end-to-end synthetic aperture radar (SAR) image recognition, the method comprising:
constructing a SAR image database with reference to an original SAR image and a SAR image virtual sample generated by a generative adversarial network;
obtaining a SAR feature image with an apparent feature by processing a SAR image to be detected sequentially using a depth vision feature extraction network trained by the SAR image database and a semantic feature enhancement network;
performing region framing and screening on the SAR feature image by a region proposal box network to obtain a SAR region feature image with a proposal box region feature;
processing the apparent feature by methods of region-of-interest feature coding and region-of-interest pooling to obtain a region detection feature, and performing target detection on the SAR image to be detected according to the region detection feature by a detection network to obtain a SAR target detection image and a compensation value returned to a detection box; and
processing the proposal box region feature by the methods of region-of-interest feature coding and region-of-interest pooling to obtain a region recognition feature, and discriminating a loss of the SAR image to be detected according to the region recognition feature by a recognition network to recognize a label and obtain a SAR target recognition image with an indicated label attribute;
wherein constructing the SAR image database with reference to the original SAR image and the SAR image virtual sample generated by the generative adversarial network comprises:
performing an electromagnetic simulation processing on the original SAR image to obtain a SAR electromagnetic simulation image;
constructing the generative adversarial network and processing the original SAR image and the SAR electromagnetic simulation image by the generative adversarial network to obtain the SAR image virtual sample; and
preprocessing the original SAR image and the SAR image virtual sample to obtain the SAR image database;
wherein performing the electromagnetic simulation processing on the original SAR image to obtain the SAR electromagnetic simulation image comprises:
constructing an electromagnetic simulation model by using the original SAR image and electromagnetic simulation parameters;
processing the electromagnetic simulation model by an electromagnetic simulation software to obtain radar r cross section (RCS) data of the original SAR image; and
performing inverse imaging processing on the RCS data to obtain the SAR electromagnetic simulation image.

2. The method for end-to-end SAR image recognition according to claim 1, wherein the depth vision feature extraction network trained by the SAR image database comprises an original foundation depth neural network and a foundation depth neural network trained by the SAR image database; and obtaining a SAR feature image with an apparent feature by processing the SAR image to be detected sequentially using a depth vision feature extraction network trained by the SAR image database and a semantic feature enhancement network comprises the following steps of:
training the original foundation depth neural network by using the SAR image to be detected, and transferring data of the foundation depth neural network trained by the SAR image database to the foundation depth neural network trained by the SAR image to be detected to obtain an initialized depth vision feature extraction network;
performing network optimization on the initialized depth vision feature extraction network by using an activation function, so that the initialized depth vision feature extraction network outputs a feature output pattern; and
simulating, coding and decoding the feature output pattern by the semantic feature enhancement network to obtain the SAR feature image with an apparent feature.

3. The method for end-to-end SAR image recognition according to claim 2, wherein performing region framing and screening on the SAR feature image by a region proposal box network to obtain a SAR region feature image with a proposal box region feature comprises the following steps of:
transmitting the SAR feature image to the region proposal box network to generate a detection box region;
comparing an Intersection over Union of the detection box region and a true value region with a threshold, and outputting a positive sample image in which the Intersection over Union of the detection box region and the true value region is greater than the threshold; and
screening k SAR region feature images with a proposal box region feature and a maximum confidence value by using a non-maximum suppression method.

4. An apparatus for end-to-end Synthetic aperture radar (SAR) image recognition, the apparatus comprising:
a processor; and
a memory connecting to the processor and having instructions stored thereon, wherein the instructions, when executed by the processor, enable the processor to:
construct a SAR image database with reference to an original SAR image and a SAR image virtual sample generated by a generative adversarial network;
obtain a SAR feature image with an apparent feature by processing a SAR image to be detected sequentially using a depth vision feature extraction network trained by the SAR image database and a semantic feature enhancement network;
perform region framing and screening on the SAR feature image by a region proposal box network to obtain a SAR region feature image with a proposal box region feature;
process the apparent feature by methods of region-of-interest feature coding and region-of-interest pooling to obtain a region detection feature, and performing target detection on the SAR image to be detected according to the region detection feature by a detection network to obtain a SAR target detection image and a compensation value returned to a detection box; and process the proposal box region feature by the methods of region-of-interest feature coding and region-of-interest pooling to obtain a region recognition feature, and discriminating a loss of the SAR image to be detected according to the region recognition feature by a recognition network to recognize a label and obtain a SAR target recognition image with an indicated label attribute;

wherein constructing the SAR image database with reference to the original SAR image and the SAR image virtual sample generated by the generative adversarial network comprises:

performing an electromagnetic simulation processing on the original SAR image to obtain a SAR electromagnetic simulation image;

constructing the generative adversarial network and processing the original SAR image and the SAR electromagnetic simulation image by the generative adversarial network to obtain the SAR image virtual sample; and preprocessing the original SAR image and the SAR image virtual sample to obtain the SAR image database;

wherein performing the electromagnetic simulation processing on the original SAR image to obtain the SAR electromagnetic simulation image comprises:

constructing an electromagnetic simulation model by using the original SAR image and electromagnetic simulation parameters;

processing the electromagnetic simulation model by an electromagnetic simulation software to obtain radar r cross section (RCS) data of the original SAR image; and performing inverse imaging processing on the RCS data to obtain the SAR electromagnetic simulation image.

5. The apparatus for end-to-end SAR image recognition according to claim 4, wherein the depth vision feature extraction network trained by the SAR image database comprises an original foundation depth neural network and a foundation depth neural network trained by the SAR image database; and obtain a SAR feature image with an apparent feature by processing the SAR image to be detected sequentially using a depth vision feature extraction network trained by the SAR image database and a semantic feature enhancement network comprises the following steps of:

training the original foundation depth neural network by using the SAR image to be detected, and transferring data of the foundation depth neural network trained by the SAR image database to the foundation depth neural network trained by the SAR image to be detected to obtain an initialized depth vision feature extraction network;

performing network optimization on the initialized depth vision feature extraction network by using an activation function, so that the initialized depth vision feature extraction network outputs a feature output pattern; and simulating, coding and decoding the feature output pattern by the semantic feature enhancement network to obtain the SAR feature image with an apparent feature.

6. The apparatus for end-to-end SAR image recognition according to claim 5, wherein perform region framing and screening on the SAR feature image by a region proposal box network to obtain a SAR region feature image with a proposal box region feature comprises the following steps of:

transmitting the SAR feature image to the region proposal box network to generate a detection box region;

comparing an Intersection over Union of the detection box region and a true value region with a threshold, and outputting a positive sample image in which the Intersection over Union of the detection box region and the true value region is greater than the threshold; and screening k SAR region feature images with a proposal box region feature and a maximum confidence value by using a non-maximum suppression method.

7. A non-transitory storage medium having computer-executable instructions stored thereon, wherein the computer-executable instructions, when executed by a computer, cause the computer to:

construct a Synthetic aperture radar (SAR) image database with reference to an original SAR image and a SAR image virtual sample generated by a generative adversarial network;

obtain a SAR feature image with an apparent feature by processing a SAR image to be detected sequentially using a depth vision feature extraction network trained by the SAR image database and a semantic feature enhancement network;

perform region framing and screening on the SAR feature image by a region proposal box network to obtain a SAR region feature image with a proposal box region feature;

process the apparent feature by methods of region-of-interest feature coding and region-of-interest pooling to obtain a region detection feature, and performing target detection on the SAR image to be detected according to the region detection feature by a detection network to obtain a SAR target detection image and a compensation value returned to a detection box; and process the proposal box region feature by the methods of region-of-interest feature coding and region-of-interest pooling to obtain a region recognition feature, and discriminating a loss of the SAR image to be detected according to the region recognition feature by a recognition network to recognize a label and obtain a SAR target recognition image with an indicated label attribute;

wherein constructing the SAR image database with reference to the original SAR image and the SAR image virtual sample generated by the generative adversarial network comprises:

performing electromagnetic simulation processing on the original SAR image to obtain a SAR electromagnetic simulation image;

constructing the generative adversarial network and processing the original SAR image and the SAR electromagnetic simulation image by the generative adversarial network to obtain the SAR image virtual sample; and preprocessing the original SAR image and the SAR image virtual sample to obtain the SAR image database;

wherein performing the electromagnetic simulation processing on the original SAR image to obtain the SAR electromagnetic simulation image comprises:

constructing an electromagnetic simulation model by using the original SAR image and electromagnetic simulation parameters;

processing the electromagnetic simulation model by an electromagnetic simulation software to obtain radar r cross section (RCS) data of the original SAR image; and performing inverse imaging processing on the RCS data to obtain the SAR electromagnetic simulation image.

8. The non-transitory storage medium according to claim 7, wherein the depth vision feature extraction network trained by the SAR image database comprises an original foundation depth neural network and a foundation depth neural network trained by the SAR image database; and obtain a SAR feature image with an apparent feature by processing the SAR image to be detected sequentially using a depth vision feature extraction network trained by the SAR image database and a semantic feature enhancement network comprises the following steps of:
training the original foundation depth neural network by using the SAR image to be detected, and transferring data of the foundation depth neural network trained by the SAR image database to the foundation depth neural network trained by the SAR image to be detected to obtain an initialized depth vision feature extraction network;
performing network optimization on the initialized depth vision feature extraction network by using an activation function, so that the initialized depth vision feature extraction network outputs a feature output pattern; and
simulating, coding and decoding the feature output pattern by the semantic feature enhancement network to obtain the SAR feature image with an apparent feature.

9. The non-transitory storage medium according to claim 8, wherein perform region framing and screening on the SAR feature image by a region proposal box network to obtain a SAR region feature image with a proposal box region feature comprises the following steps of:
transmitting the SAR feature image to the region proposal box network to generate a detection box region;
comparing an Intersection over Union of the detection box region and a true value region with a threshold, and outputting a positive sample image in which the Intersection over Union of the detection box region and the true value region is greater than the threshold; and
screening k SAR region feature images with a proposal box region feature and a maximum confidence value by using a non-maximum suppression method.

* * * * *